United States Patent
Zepf

(10) Patent No.: US 8,435,431 B2
(45) Date of Patent: May 7, 2013

(54) METHOD FOR PRODUCING A LASER PROCESSING MACHINE COMPONENT HAVING A CORROSION-RESISTANT INTERNAL COATING

(75) Inventor: Timo Zepf, Seitingen-Oberflacht (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 1183 days.

(21) Appl. No.: 12/331,006

(22) Filed: Dec. 9, 2008

(65) Prior Publication Data

US 2009/0179012 A1     Jul. 16, 2009

Related U.S. Application Data

(63) Continuation of application No. PCT/EP2006/005621, filed on Jun. 12, 2006.

(51) Int. Cl.
*B29C 39/10* (2006.01)
*B29C 69/00* (2006.01)

(52) U.S. Cl.
USPC ........... 264/134; 264/267; 264/296; 264/294; 264/154; 264/155

(58) Field of Classification Search ........................ None
See application file for complete search history.

(56) References Cited

U.S. PATENT DOCUMENTS

| | | | | |
|---|---|---|---|---|
| 1,658,564 | A | * | 2/1928 | MacDonald .................. 264/269 |
| 4,387,962 | A | * | 6/1983 | Gowan et al. ................. 359/845 |
| 4,719,035 | A | * | 1/1988 | Palmer .......................... 252/390 |
| 5,002,378 | A | * | 3/1991 | Colarusso et al. ............ 359/845 |
| 6,792,016 | B2 | | 9/2004 | Kugler |
| 2003/0207145 | A1 | | 11/2003 | Anderson et al. |

FOREIGN PATENT DOCUMENTS

| | | |
|---|---|---|
| DE | 19955574 | 7/2001 |
| DE | 10102969 | 7/2002 |
| EP | 1359198 | 11/2003 |
| FR | 2750630 | 1/1998 |
| JP | 1207702 | 8/1989 |
| JP | 2000288764 A | 10/2000 |
| JP | 2002164594 | 6/2002 |
| JP | 2002219593 A | 8/2002 |
| JP | 2003200285 A | 7/2003 |
| JP | 2003211164 A | 7/2003 |
| JP | 2005217150 A | 8/2005 |

OTHER PUBLICATIONS

International Preliminary Report on Patentability from corresponding PCT Application No. PCT/EP2006/005621, mailed Jun. 12, 2006, 9 pages.

* cited by examiner

*Primary Examiner* — Edmund H. Lee
(74) *Attorney, Agent, or Firm* — Fish & Richardson P.C.

(57) ABSTRACT

A component of a laser processing machine includes an aluminum base member in which a duct is constructed in order to convey copper-ionized water. The duct has a corrosion-resistant plastic coating.

8 Claims, 8 Drawing Sheets

METHOD FOR PRODUCING A LASER PROCESSING MACHINE COMPONENT HAVING A CORROSION-RESISTANT INTERNAL COATING

CROSS REFERENCE TO RELATED APPLICATION

This application claims priority under 35 U.S.C. §120 to and is a continuation in part of PCT/EP2006/005621, filed on Jun. 12, 2006. This priority application is hereby incorporated by reference in its entirety.

TECHNICAL FIELD

The invention relates to a laser processing machine component having an aluminum base member defining a duct that conveys water and is coated with a corrosion-resistant plastic coating.

BACKGROUND

Components, for example, laser processing heads, are used in laser welding installations. These components can include a body that houses or holds mirrors used to alter a laser beam that is used to process one or more workpieces. The body can be made of aluminum.

Water is used in laser welding heads in order to cool mirrors. If the laser welding heads include ducts made of copper, then the water can become copper-ionized.

SUMMARY

In some general aspects, a component of a laser processing machine includes an aluminum base member defining a duct that is constructed to convey copper-ionized water. The duct includes a corrosion-resistant plastic coating.

Implementations can include one or more of the following features. For example, the component can be a laser processing head. The base member can include receiving members for mirrors for altering the properties of a laser beam of the laser processing machine. A first receiving member can receive a redirecting mirror and a second receiving member can receive a focusing mirror.

The coating can include a shoulder or a bead that enables the duct to be sealed from materials that are external to the cooling circuit.

The coating can be made of a polymer or an epoxy resin.

In other general aspects, a plastic coating of a duct of a component of a laser processing machine is produced. An opening in a base member of the component is constructed, the opening is filled with a corrosion-resistant plastic material, the corrosion-resistant material is cured to form a corrosion-resistant plastic coating within the opening, and the opening is processed to form a duct that has an inner diameter in the corrosion-resistant plastic coating that is smaller than an inner diameter of the constructed opening.

Implementations can include one or more of the following features. For example, a pressure at the filled opening can be reduced prior to curing of the corrosion-resistant plastic material. Curing can be carried out in a warm state or in a cold state.

The opening can be filled with the corrosion-resistant plastic material by flushing the opening with a plastic material. The plastic material can be a polymer or an epoxy resin.

The corrosion-resistant plastic material can be subjected to a pressure that is reduced from atmospheric pressure. The corrosion-resistant plastic material can be subjected to a reduced pressure before curing. The corrosion-resistant plastic material can be subjected to a reduced pressure after curing. The corrosion-resistant plastic material can be subjected to a reduced pressure during curing.

In other general aspects, a laser processing machine includes a laser that produces a laser beam, and a laser processing head through which the laser beam travels. The laser processing head includes an aluminum base member, and one or more copper mirrors received by the aluminum base member. The aluminum base member defines one or more ducts that convey water through an internal corrosion-resistant plastic coating to enable the ducts to convey copper-ionized water without corroding.

Implementations can include one or more of the following features. For example, the base member can include receiving members for the one or more mirrors, where the one or more mirrors alter the properties of the laser beam that enters the laser processing head.

The base member can include a first receiving member that receives a redirecting copper mirror, and a second receiving member that receives a focusing copper mirror.

The internal coating can include a shoulder or a bead. The plastic coating can be made of a polymer or an epoxy resin.

The aluminum (or aluminum alloy) component of the laser processing machine is designed in such a way that copper-ionized water can be conveyed through it in a manner that is cost-effective and that inhibits corrosion of the aluminum. Moreover, the aluminum component having this design is easy manufacture.

Components of aluminum can be made corrosion resistant with the applied corrosion-resistant coating (for example, epoxy resin) without the coating becoming damaged during an anodizing operation. Epoxy resin is found to be particularly good because it is temperature-resistant, simple to handle, and chemically resistant. Good protection against corrosion is produced without having to anodize the aluminum. There is brought about a reduction in weight in comparison with previously used pipes of high-grade steel or copper. Disruptive contours owing to disruptive hoses or other pipes are reduced or prevented. The number of components needed to hold and cool the mirrors is reduced. The coating has high temperature resistant up to approximately 110° C. depending on the material of the coating that is used. The assembly complexity can be reduced by reducing the number of components. Components of aluminum of this design can be produced without special machinery.

Shoulders or beads can be formed in the coating material. The duct is thereby reliably sealed with respect to the aluminum base member in conjunction with a commercially available sealing ring (for example, an O-ring or a gasket).

One preferred embodiment of the invention is schematically illustrated in the drawings, and is explained in greater detail below with reference to the drawings. The explanation relates to a base member of a laser welding head. However, it is also conceivable to use the invention in similar components of a laser processing machine. In the drawings:

DETAILED DESCRIPTION

Figure 1:
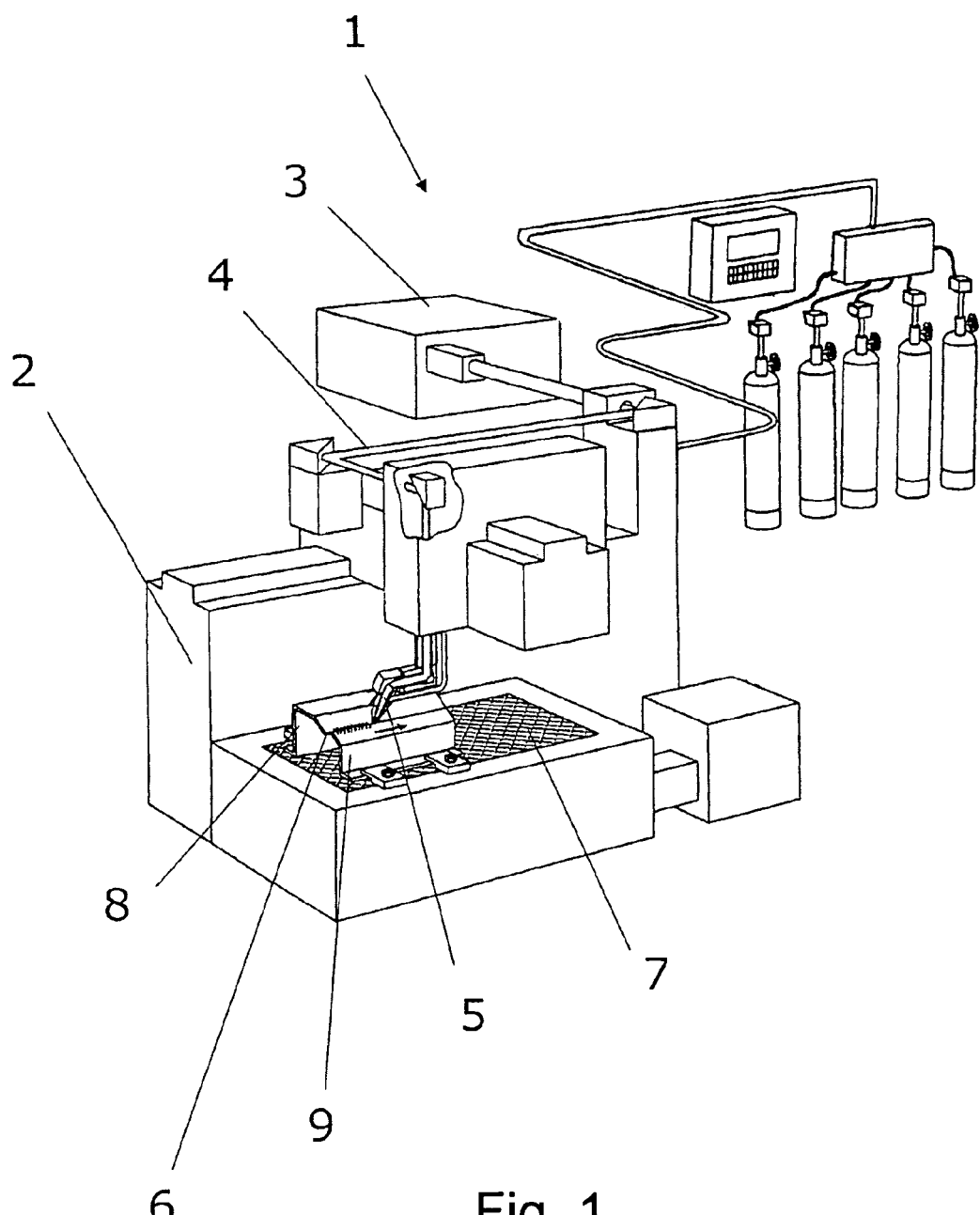
FIG. 1 is a perspective view of a laser processing machine for laser welding.

FIG. 1 shows the construction of a laser processing machine 1 for laser welding. A machine frame 2 carries the movement unit of the machine and the beam guidance system having redirecting mirrors for a laser beam 4 that is produced in a laser 3.

A laser welding head 5 having a redirecting mirror and a focusing mirror can be moved by means of two axes of rotation and in three directions in order to be best able to process a weld seam 6 for joining two components 8 and 9 that are arranged on a support 7. The components 8 and 9 are fixed by means of a clamping device. For laser welding, process gases, such as operating gases or protective gases (for example, helium, argon, carbon dioxide, oxygen, nitrogen) can be supplied to the laser welding head 5 and can be discharged by means of a discharge device.

Figure 2:
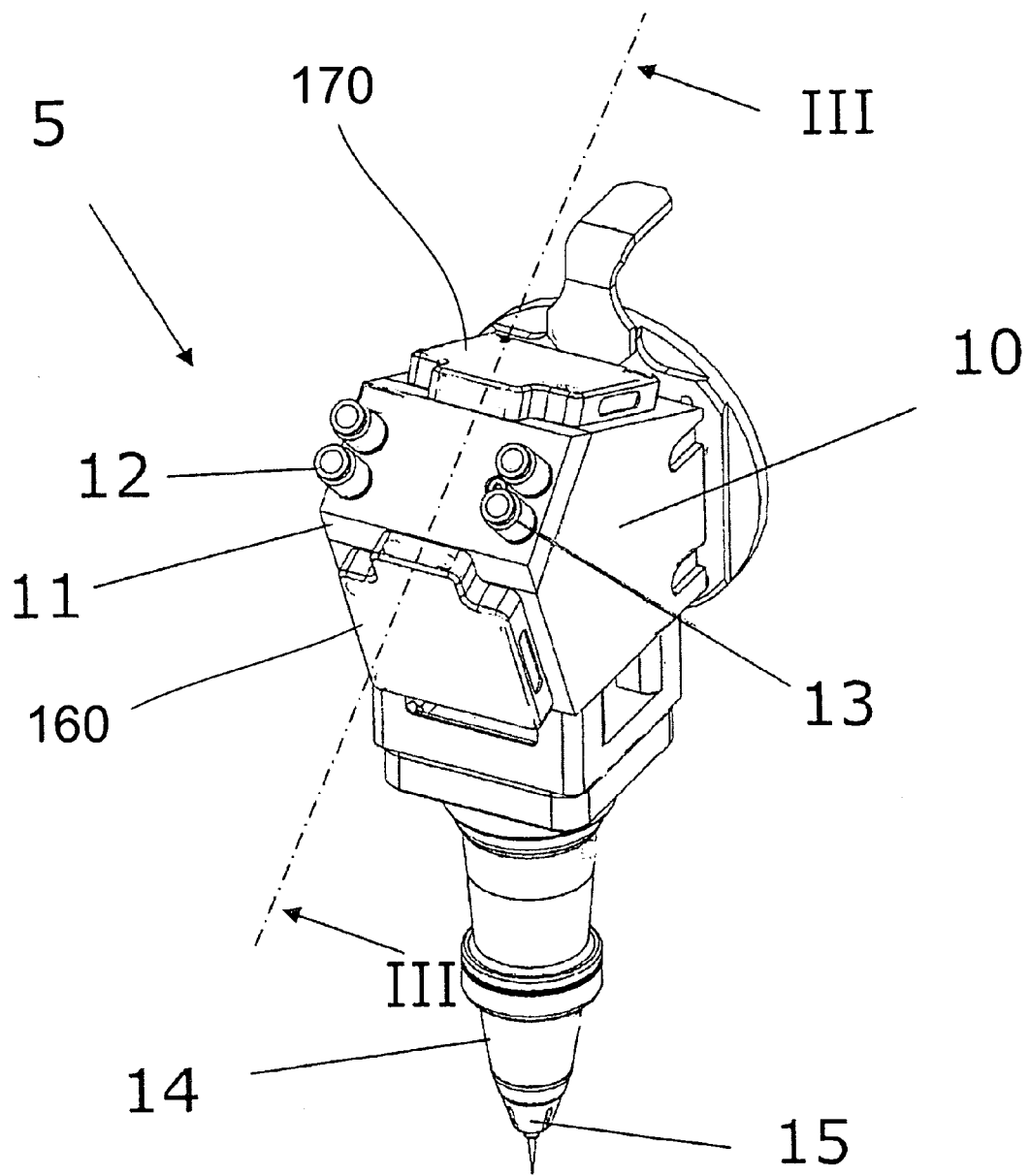
FIG. 2 is a perspective view of a laser welding head of the laser processing machine of FIG. 1.

FIG. 2 relates to the construction of the laser welding head 5. Mirrors 16, 17 (shown in FIG. 3) are secured to a base member 10 with respective mirror mounts 160, 170. The mirrors 16, 17 redirect and focus the laser beam. The base member 10 is made of aluminum or an aluminum alloy because it is light and easier to maneuver because the laser welding head 5 is moved during processing. Moreover, aluminum is cheaper than other metals and metal alloys and is easier to machine. In order to cool the mirrors, ducts for a coolant are formed in the base member 10 and are coupled to a cooling circuit that can include channels made of copper. Therefore, a distribution block 11 adjoins the base member 10 and corresponding connections 12 and 13 are provided therein for an inlet and an outlet of the coolant, which can be a fluid such as a gas or a liquid. The laser welding head 5 further includes a nozzle tube 14 and a nozzle 15.

Figure 3:
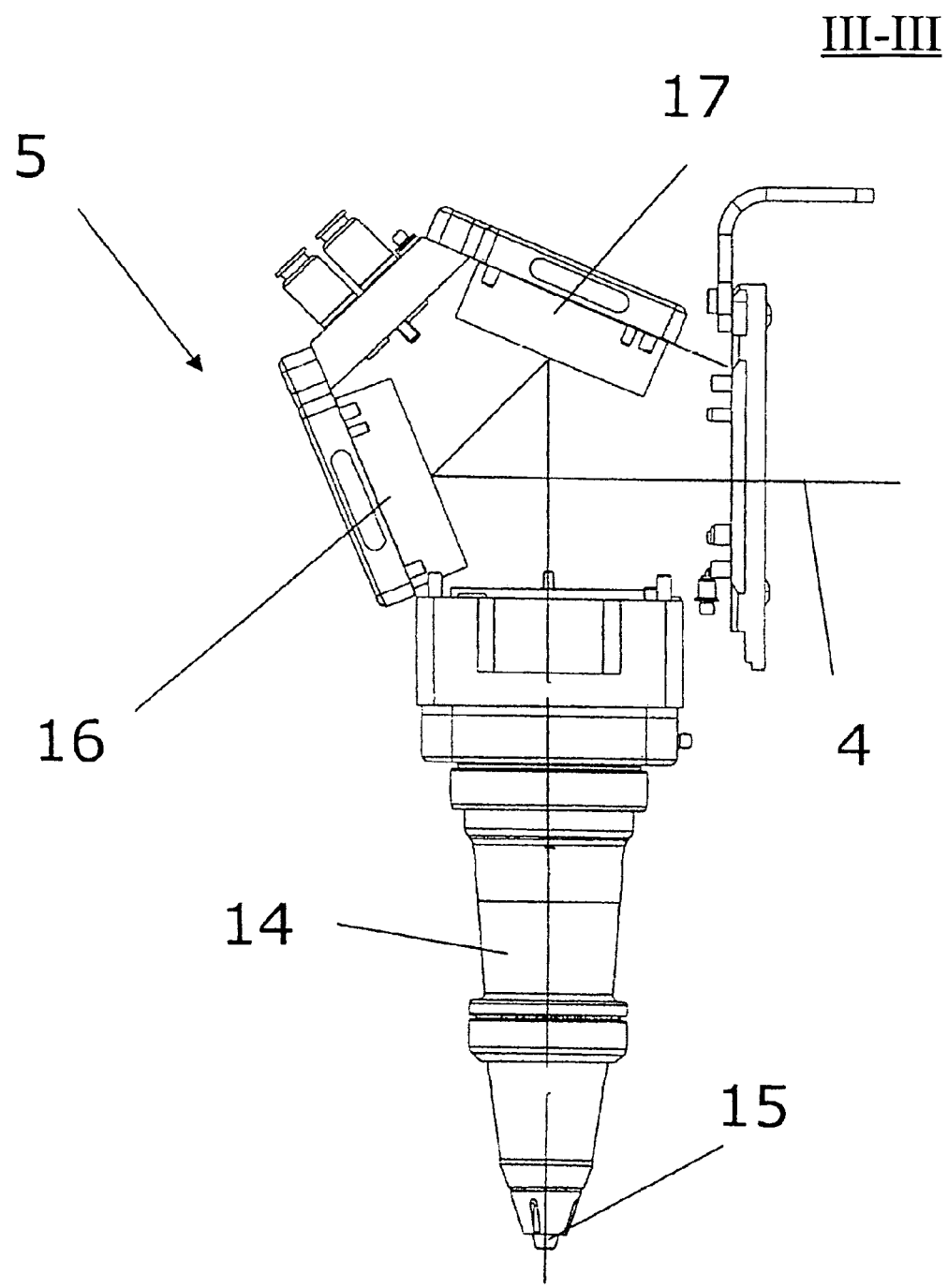
FIG. 3 is a longitudinal section view through the laser welding head of FIG. 2 along the line III-III.

FIG. 3 illustrates the beam path of the laser beam 4 in the laser welding head 5, which includes a redirecting mirror 16 and a focusing mirror 17 on (for example, integral with or attached to) the base member 10. The mirrors 16, 17 require cooling. The nozzle 15 and/or the nozzle tube 14 can also be cooled so that the protective gas is not heated too powerfully (that disrupts the process) and in order to reduce the wear of the nozzle 15. The ducts that are constructed for cooling the base member 10 and the nozzle 15 and the nozzle tube 14 are in the components and are not illustrated in FIG. 3 for the sake of clarity.

Figure 4:
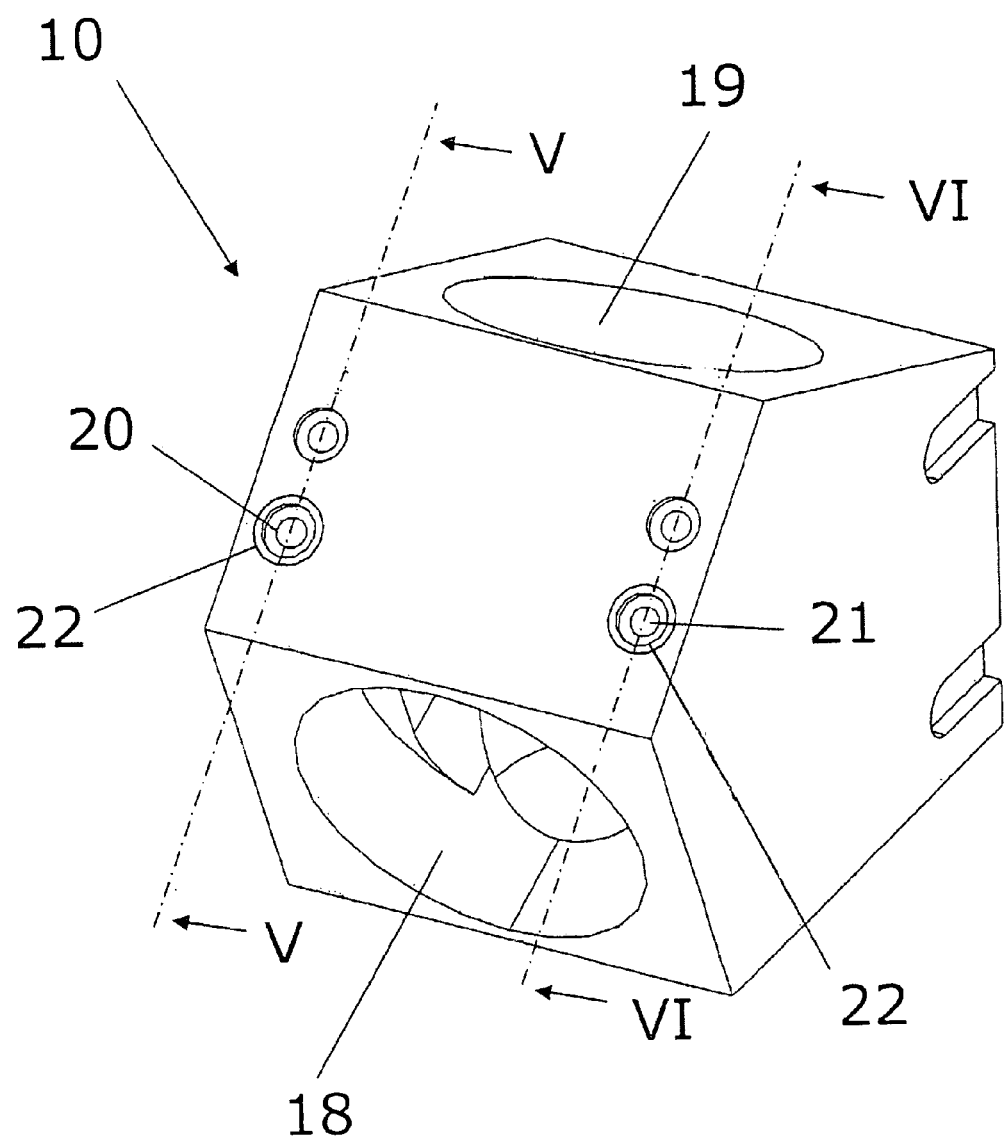
FIG. 4 is a perspective view of a base member of the laser welding head of FIG. 2.

FIG. 4 shows the aluminum base member 10 disassembled from the laser welding head 5. The base member 10 substantially includes two receiving members 18 and 19 for, respectively, the redirecting mirror 16 and the focusing mirror 17, and ducts 20 and 21 for the coolant. For corrosion protection, the ducts 20 and 21 are provided with a plastic coating 22.

Figure 5:
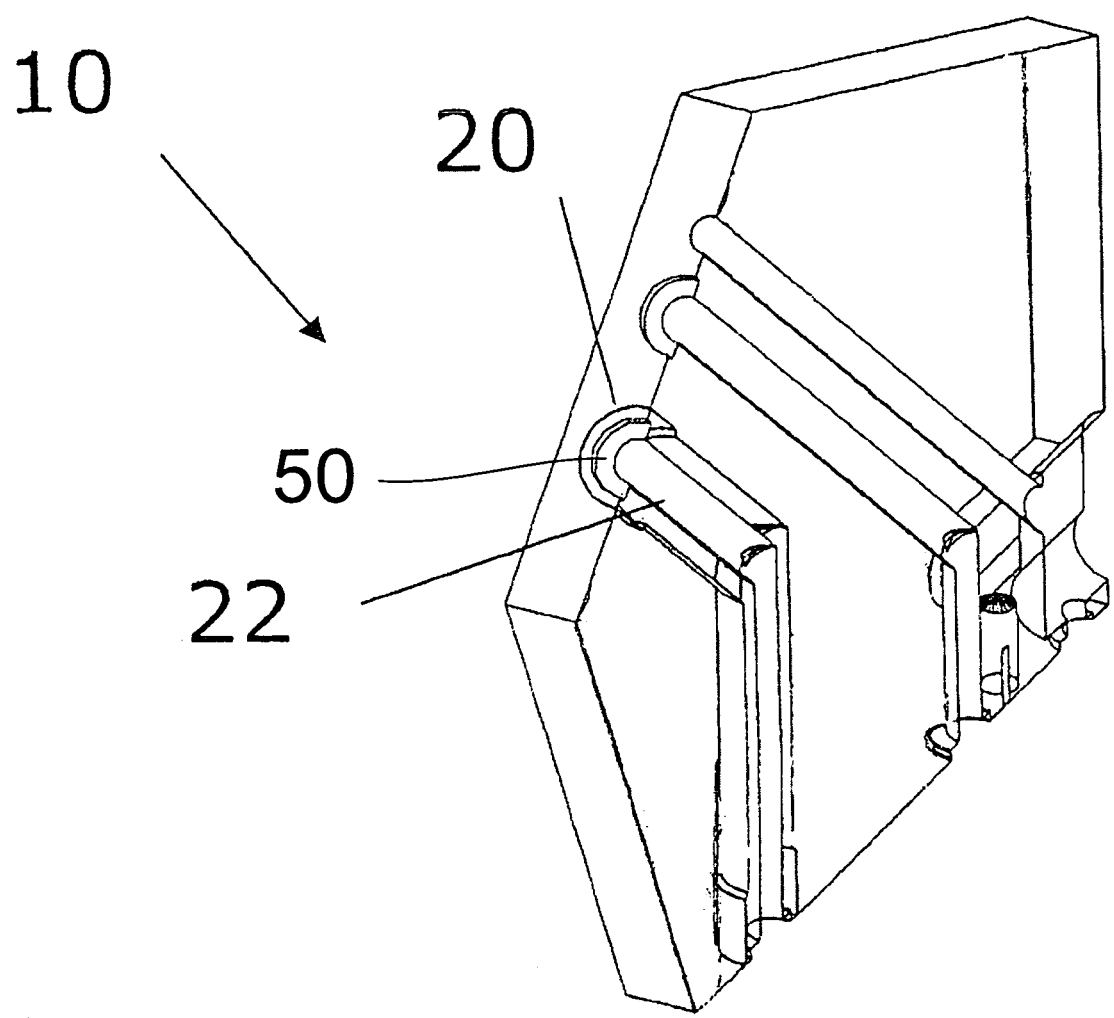
FIG. 5 is a longitudinal section view through the base member of FIG. 4 along the line V-V.
Figure 6:
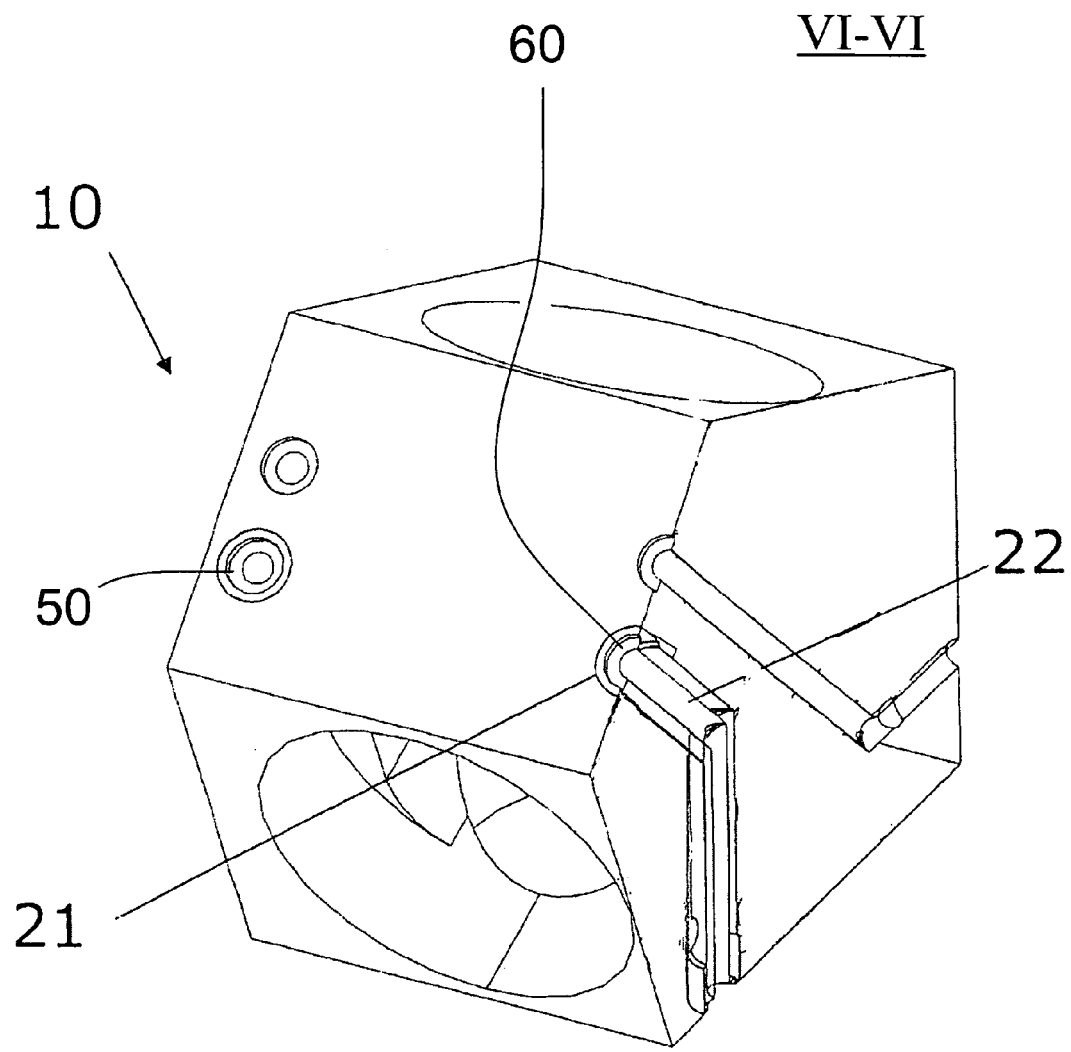
FIG. 6 is another longitudinal section view through the base member of FIG. 4 along the line VI-VI.

According to FIGS. 5 and 6, the ducts 20 and 21 are constructed in an identical manner. The inner side of the ducts 20 and 21 is covered by the plastic coating 22. The plastic coating 22 provides corrosion protection and can be made of, for example, epoxy, a polymer, or any plastic that provides a corrosion-resistant coating.

Figure 7:
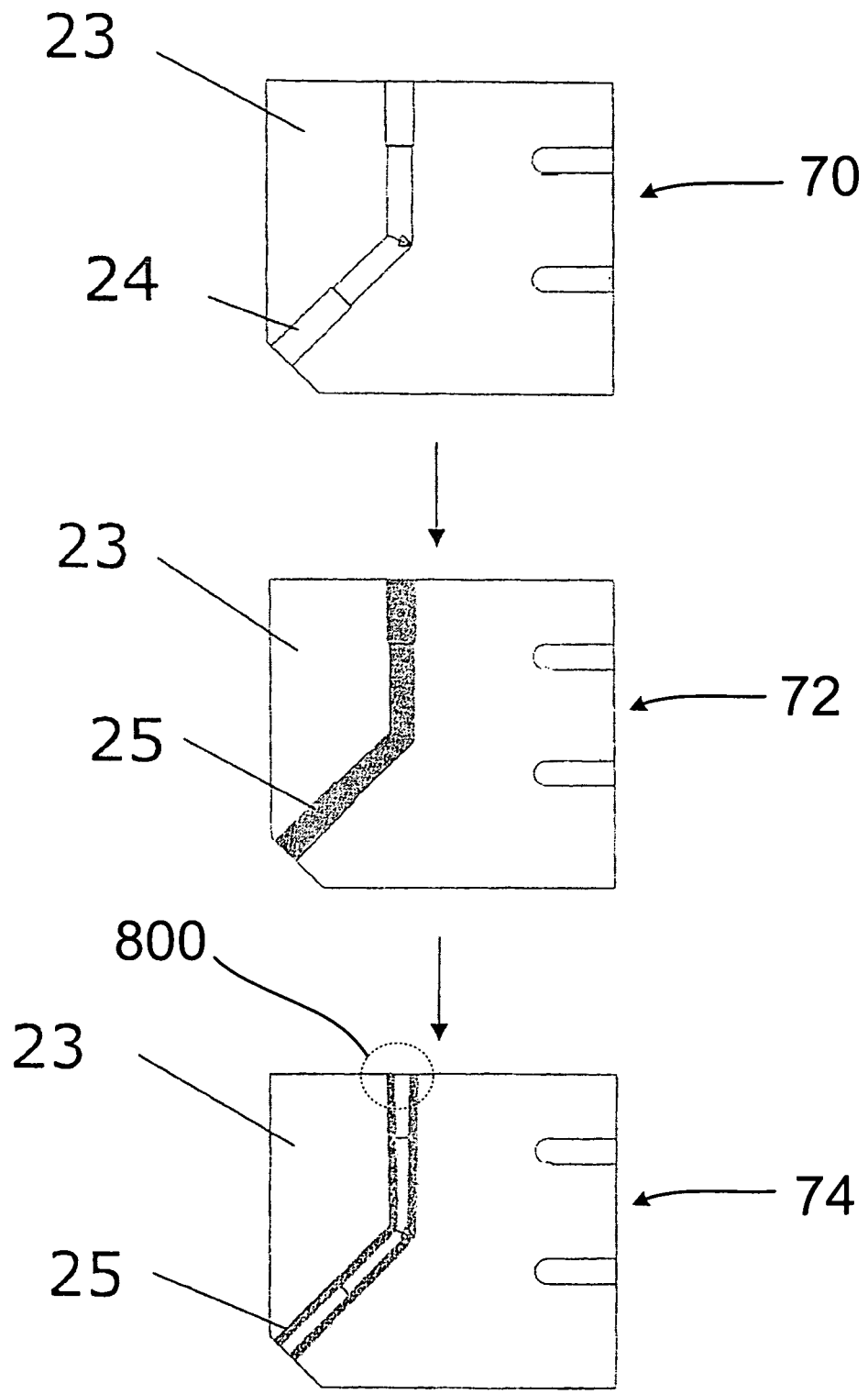
FIG. 7 is an illustration of the sequence of the significant steps for producing corrosion protection of the ducts in the base member of FIG. 4.

A procedure is performed for producing the ducts 20, 21 in the base member 10, according to FIG. 7. Initially, the procedure begins with an aluminum blank 23 that will eventually become the base member 10. First, an opening 24 is formed within the blank 23 (step 70). The dimensions of the opening 24 depend on the necessary wall thickness of the plastic coating 22. Subsequently, the opening 24 is flushed (that is, filled) with a fluid polymer 25, such as, for example, an epoxy resin (step 72). To avoid formation of bubbles, the polymer 25 is subject to reduced pressure for a time before and/or after the flushing of the opening 24 at step 72, where the time is sufficient to avoid substantial formation of bubbles. The reduced pressure is a pressure that is reduced relative to atmospheric pressure. Alternatively, the polymer 25 can be subject to reduced pressure while the opening 24 of the base member 10 is being flushed. This ensures that even the smallest cavities, for example, undercuts, are flushed in a bubble-free manner. The polymer 25 can be cured in a cold or a warm state relative to ambient temperature. That is, the polymer 25 can be cooled or heated during curing by an external thermal device. Curing of the polymer 25 involves the hardening of the polymer 25 to form the coating 22. In the cured state, that is, after the polymer 25 has cured enough to a hardened state, the polymer 25 can be processed with a cutting operation for example, by sanding, cutting, or drilling to form an opening within the polymer 25 and to ultimately form the duct 20, 21. Therefore, the opening 24 can be processed so as to have the necessary dimensions by removing material of the cured polymer 25 as needed (such as by drilling). In this way, the duct 20, 21 in its final form after the coating 22 is applied has a smaller inner diameter than the opening 24 that is originally formed in the blank 23 at step 70.

Figure 8A:
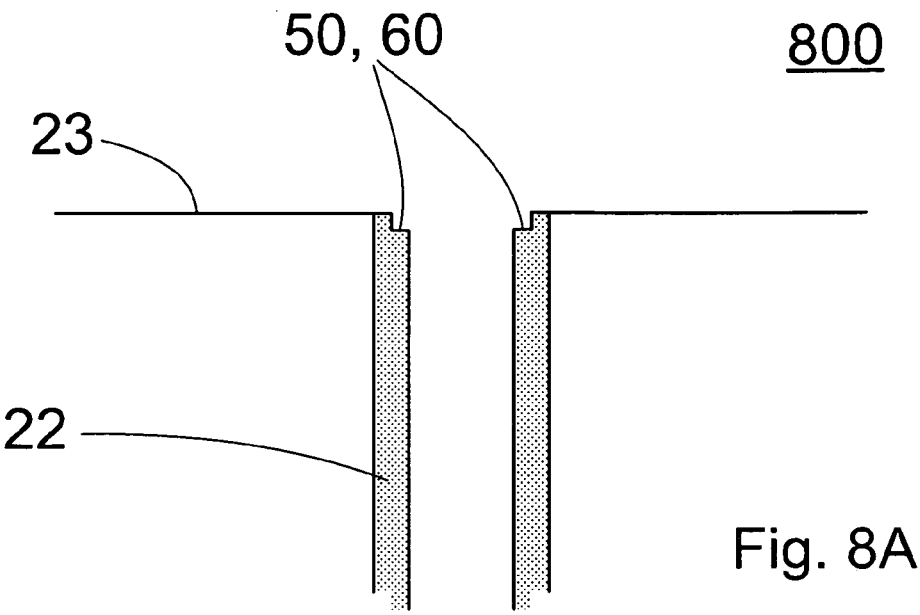
FIGS. 8A and 8B are cross-sectional side views of portions of the ducts in the base member of FIG. 4.
Figure 8B:
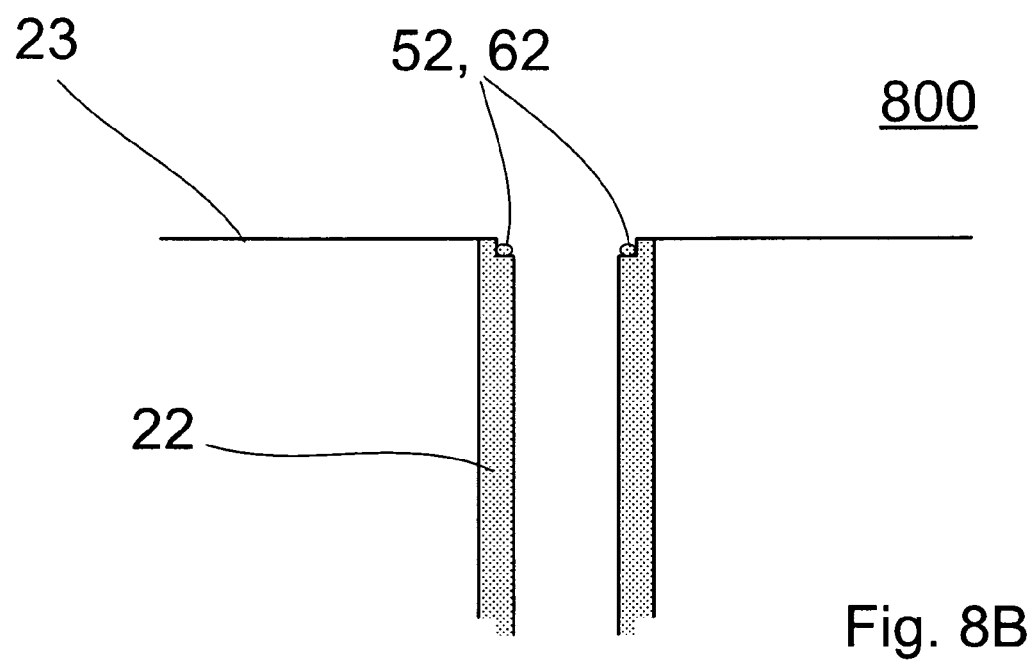

Lastly, as shown in FIG. 8A, step-like shoulders or recesses 50, 60 can be formed at the surface of the respective duct 20, 21 to form a corrosion-resistant sealing face, at which commercially available O-rings are used and the ducts 20, 21 are sealed therewith with respect to the surrounding component. In other implementations, as shown in FIG. 8B, beads 52, 62 can be formed in the coating 22.

Alternatively, the polymer 25 can be applied by means of a centrifugal casting method.

What is claimed is:

1. A method for producing a plastic coating of a duct of a component of a laser processing machine, the method comprising:

constructing an opening in a base member of the component;

filling the opening with a corrosion-resistant plastic material;

curing the corrosion-resistant plastic material to form a corrosion-resistant plastic coating within the opening; and processing the corrosion-resistant plastic coating within the opening to form a duct that has an inner diameter in the corrosion-resistant plastic coating that is smaller than an inner diameter of the constructed opening.

2. The method of claim 1, further comprising reducing a pressure at the filled opening prior to curing of the corrosion-resistant plastic material.

3. The method of claim 1, wherein curing is carried out in a warm state or in a cold state.

4. The method of claim 1, wherein the corrosion-resistant plastic material is a polymer or an epoxy resin.

5. The method of claim 1, further comprising subjecting the corrosion-resistant plastic material to a pressure that is reduced from atmospheric pressure.

6. The method of claim 5, wherein the corrosion-resistant plastic material is subjected to a reduced pressure before curing.

7. The method of claim 5, wherein the corrosion-resistant plastic material is subjected to a reduced pressure after curing.

8. The method of claim 5, wherein the corrosion-resistant plastic material is subjected to a reduced pressure during curing.

\* \* \* \* \*